(12) United States Patent
Enthaler et al.

(10) Patent No.: US 11,091,044 B2
(45) Date of Patent: Aug. 17, 2021

(54) METHOD FOR PREPARING A VEHICLE

(71) Applicant: AUDI AG, Ingolstadt (DE)

(72) Inventors: Achim Enthaler, Ingolstadt (DE);
Michael Mürken, Ingolstadt (DE);
Andreas Thanheiser, Eichstätt (DE)

(73) Assignee: AUDI AG, Ingolstadt (DE)

( * ) Notice: Subject to any disclaimer, the term of this patent is extended or adjusted under 35 U.S.C. 154(b) by 44 days.

(21) Appl. No.: 15/976,119

(22) Filed: May 10, 2018

(65) Prior Publication Data

US 2018/0354381 A1 Dec. 13, 2018

(30) Foreign Application Priority Data

Jun. 8, 2017 (DE) ...................... 10 2017 209 711.6

(51) Int. Cl.
| | |
|---|---|
| *H02J 7/00* | (2006.01) |
| *B60L 53/00* | (2019.01) |
| *G06Q 10/06* | (2012.01) |
| *B60L 53/60* | (2019.01) |
| *B60L 53/68* | (2019.01) |
| *B60L 53/36* | (2019.01) |
| *B60L 53/30* | (2019.01) |

(Continued)

(52) U.S. Cl.
CPC ........... *B60L 53/00* (2019.02); *B60L 11/1833* (2013.01); *B60L 53/305* (2019.02); *B60L 53/36* (2019.02); *B60L 53/50* (2019.02); *B60L 53/60* (2019.02); *B60L 53/68* (2019.02); *G06Q 10/0631* (2013.01); *B60L 2260/32* (2013.01); *G06Q 10/20* (2013.01); *G06Q 50/30* (2013.01)

(58) Field of Classification Search
USPC .......................................... 320/109
See application file for complete search history.

(56) References Cited

U.S. PATENT DOCUMENTS

| | | | |
|---|---|---|---|
| 2004/0083030 A1 | 4/2004 | Sumida et al. | |
| 2011/0074350 A1* | 3/2011 | Kocher | B60L 53/53 320/109 |

(Continued)

FOREIGN PATENT DOCUMENTS

| | | |
|---|---|---|
| CN | 102682488 A | 9/2012 |
| CN | 204334087 U * | 5/2015 |

(Continued)

OTHER PUBLICATIONS

Machine Translation of CN204334087, May 13, 2015.*

(Continued)

*Primary Examiner* — Samuel Berhanu
(74) *Attorney, Agent, or Firm* — Maier & Maier, PLLC (57) ABSTRACT

A method for preparing a vehicle for at least one future drive. The vehicle has at least one electric energy storage unit, with which at least one electric machine is supplied with electric energy. The vehicle is assigned to a system, which has at least one electric charging station and at least one station for provided services. The vehicle is further assigned to the at least one station for provided services, with which at least one provided service is made available. The at least one electric energy storage unit is connected to the at least one electric charging station when the at least one provided service is made available, and, through the at least one electric charging station, is supplied with electric energy.

12 Claims, 2 Drawing Sheets (51) Int. Cl.
*B60L 53/50* (2019.01)
*B60L 11/18* (2006.01)
*G06Q 50/30* (2012.01)
*G06Q 10/00* (2012.01)

(56) References Cited

U.S. PATENT DOCUMENTS

| | | | | |
|---|---|---|---|---|
| 2012/0010894 A1* | 1/2012 | Jammer | ............... | H01M 10/46 705/1.1 |
| 2012/0236149 A1* | 9/2012 | Nagy | ................ | G08G 1/146 348/148 |
| 2015/0006157 A1* | 1/2015 | Andrade Silva | ...... | G06F 40/247 704/9 |
| 2015/0348335 A1* | 12/2015 | Ramanujam | .......... | G07C 5/006 701/23 |
| 2017/0001527 A1* | 1/2017 | Prokhorov | ............. | B60L 53/65 |
| 2017/0136881 A1* | 5/2017 | Ricci | ....................... | B60L 5/18 |

FOREIGN PATENT DOCUMENTS

| | | |
|---|---|---|
| CN | 205451297 U | 8/2016 |
| DE | 10 2014 221 754 A1 | 4/2016 |
| DE | 10 2014 224 113 A1 | 6/2016 |
| DE | 10 2015 201 205 A1 | 7/2016 |

OTHER PUBLICATIONS

Search Report dated Oct. 26, 2018 in corresponding European Application No. 18168677.5; 16 pages including partial machine-generated English-language translation.
Carwash.com, "Wash installs charging station for electric vehicles", [online] URL, htttps://web.archive.org.web/20151030142739/http://www.carwash.com/wash-installs-charging-station-electric-vehicles, Oct. 29, 2015.
Examination Report dated Jan. 30, 2018 of corresponding German application No. 10 2017 209 711.6; 9 pgs.
European Office Action dated Apr. 21, 2020, in connection with corresponding EP Application No. 18 168 677.5 (12 pgs., including machine-generated English translation).
Stuart Miles, "Formula E racing cars to feature Qualcomm Halo wireless charging", Sep. 9, 2013, at URL: https://www.pocket-lint.com/cars/news/qualcomm/123509-formula-e-racing-cars-to-feature-qualcomm-halo-wireless-charging (2 pgs.).
Chinese Office Action dated Jan. 26, 2021, in connection with corresponding CN Application No. 201810579437.3 (18 pp., including machine-generated English translation).
European Examination Report dated May 20, 2021, in connection with corresponding EP Application No. 18 168 677.5 (9 pp., including machine-generated English translation).

* cited by examiner

METHOD FOR PREPARING A VEHICLE

FIELD

The invention relates to a method for preparing a vehicle for at least one future drive, a method for preparing a plurality of vehicles for future drives, and a system for preparing a vehicle for at least one future drive.

BACKGROUND

A vehicle needs energy for its locomotion. In the case that, For this purpose, the vehicle has at least one electric drive, the electric energy is supplied to said electric drive from an electric energy storage unit of the vehicle. However, it needs to be taken into consideration in this case that the at least one electric energy storage unit is drained over the course of time. For this reason, it is necessary for a driver of the vehicle to drive said vehicle routinely to an electric charging station, so that the electric energy can be charged into the at least one energy storage unit of the vehicle. Moreover, it is routinely necessary to replenish or freshen up a state of the vehicle, this comprising, for example, such measures as cleaning the interior and exterior of the vehicle or replacing and/or replenishing another operating medium of the vehicle.

A method for carrying out an automatic parking operation for a vehicle is known from the publication DE 10 2014 221 754 A1. With this method, it is also possible to provide a charging function for recharging a battery of the vehicle.

A parking spot management server for a parking spot is known from the publication DE 10 2014 224 113 A1. Here, too, it is possible to re-charge an electric energy storage unit of the vehicle.

The publication DE 10 2015 201 205 A1 describes a method for optimized utilization of a parking area on which vehicles are parked.

SUMMARY

Against this background, an object of the invention was provide services for a vehicle.

The method according to the invention is provided for preparing a vehicle for at least one future drive, that is, one drive or a plurality of drives, wherein the vehicle has at least one electric energy storage unit, with which at least one electric machine of the vehicle that is constructed for driving the vehicle is supplied and/or is to be supplied with electric energy. The method is carried out using, among other things, a system that has at least one electric charging station and at least one station for provided services or service station. In this case, the vehicle is is assigned to the system and further to the at least one station for provided services, with which at least one provided service or at least one service is made available to the vehicle. During this process, that is, during the time when the at least one service is provided, the at least one electric energy storage unit is connected to the at least one electric charging station and is supplied with electric energy by way of said at least one electric charging station.

Accordingly, in one embodiment, the at least one provided service is made available to the vehicle by the at least one station for provided services, wherein it is possible, at the same time or at a different point in time, for the at least one electric energy storage unit to be supplied with electric energy by the at least one charging station. When the method is carried out, the at least one electric energy storage unit of the vehicle is charged by carrying out an electric charging operation and, as a rule, at the same time, the at least one provided service is made available to the vehicle. It is possible here for the vehicle to be connected to a charging station over a period of time and, during this process, to be assigned initially to a first station for provided services for making available a first provided service and afterwards to be assigned to a second station for provided services for making available a second station for a second provided services, etc.

As a rule, the vehicle has at least one communication module. Furthermore, it is provided that the system likewise has at least one communication module, wherein, in one embodiment, it is thereby provided that, in each case, a communication module is assigned to the at least one electric charging station as well as to the at least one station for provided services. The communication module of the vehicle as well as the at least one communication module of the system thereby exchange data and/or information via electromagnetic waves.

In the case that, for the vehicle, at least one provided service is to be made available and/or is to be carried out and, in the case that the at least one electric energy storage unit of the vehicle is to be supplied with electric energy, it is possible in the scope of the method for the vehicle to communicate in advance with the system and to inform it of the at least one provided service that is to be made available to the vehicle. Furthermore, the system is designed for the purpose of planning in advance a layover of the vehicle within the system, wherein a planning of this kind comprises, among other things, the provision as to the sequence in which the vehicle is to be assigned to a respective station for provided services.

Once the vehicle has reached the system that has the at least one electric charging station and the at least one station for provided services or service station, it is handed over to the at least one electric charging station and/or station for provided services. It is thereby provided that, for the vehicle that is to be prepared, at least one provided service has already been booked. Accordingly, the vehicle is handed over to the at least one station for provided services with which the booked provided service can be carried out. In the case that it is further necessary to supply and, accordingly, to charge the at least one electric energy storage unit of the vehicle with electric energy, the vehicle is connected, at the same time, to the at least one charging station.

In one embodiment, it is possible for the vehicle to drive autonomously to a respectively designated station for provided services or charging station. A route or distance that is thereby to be taken into consideration within the system, which specifies how the vehicle is to travel from a first station for provided services or charging station to a second station for provided services or charging station and, if need be, to at least one other station for provided services or charging station, is thereby made available to the vehicle by the system. Alternatively or additionally, however, it is also possible for the vehicle to communicate with individual stations for provided services or charging stations within the system and thereby to be piloted from one station for provided services or charging station to another station for provided services or a charging station. In one embodiment, this also relates to the measure that a station for provided services or a charging station that is to be traveled toward is defined as a goal for the vehicle, wherein it is provided that the vehicle travels toward said station for provided services or charging station in an identified and automatic manner.

A respective position of the vehicle within the system and, accordingly, in relation to the stations for provided services as well as in relation to the charging stations is also to be recorded, for example, by at least one camera, which is likewise designed as a component of the system. Accordingly, the system is designed for the purpose of visually locating the vehicle by means of the at least one camera. Furthermore, it is likewise possible for the system to locate the vehicle through communication with the vehicle. By means of the at least one camera, it is possible to carry out image recognition, wherein it is provided that the at least one camera is arranged at an elevated position within the system, wherein a distance of the at least one camera from the ground or subsurface is greater than the height of the vehicle.

While the vehicle is situated within the system, a communication connection, which is constant, for example, is established between the vehicle and the system, usually between the vehicle and the at least one station for provided services of the system. Accordingly, it is possible to locate the vehicle within the system in relation to the at least one station for provided services as well as also to make available to the vehicle information as to when the at least one provided service is made available to the vehicle, how far said service has progressed, and when said service has ended.

It is thereby likewise possible for a route of the vehicle within the system to be updated. Taking this into consideration, information is made available to the vehicle as to which station for provided services the vehicle is to travel toward in each case.

It is possible, for example, for the at least one station for provided services to be constructed as a carwash. In this case, too, a respectively current position of the vehicle is recorded by the system by means of the at least one camera using image recognition, wherein it is also taken into consideration how the vehicle is positioned at the particular current moment with respect to the carwash as a possible station for provided services. Once the vehicle has reached a position defined for the carwash, at which a washing program can be executed for the vehicle in order to clean the vehicle, said washing program is started. A carwash of this kind comprises, for example, rotating brushes, water nozzles, and ultrasound sensors. Via the ultrasound sensors, a respective position of a rotating brush and a water nozzle in relation to a contour and, accordingly, in relation to an outer wall of the vehicle is determined. Accordingly, when the washing program is carried out, it is possible to move the rotating brushes and the water nozzles in relation to the contour of the vehicle and thereby to wash said vehicle. Once the washing program or a washing operation has ended as a provided service, this fact is communicated to the vehicle by the system.

In one embodiment, the vehicle is cleaned and/or serviced by the, with the, or at the at least one station for provided services. In addition, it is possible for at least one substance to be added to the vehicle by the, with the, and/or at the at least one station for provided services. Said at least one substance can be, for example, an operating medium required for operating the vehicle, which is replenished and/or replaced. The at least one substance is, alternatively or additionally, a food, such as, for example, a solid food and/or a liquid food formed as a beverage, which is consumed by occupants of the vehicle and can likewise be replenished and/or replaced. The at least one substance is, for example, formed and/or to be referred to as a so-called consumable, wherein it can be, for example, a beverage or food, that is, a meal or a snack, which can be consumed by a user of the vehicle. The at least one substance is formed, furthermore, as an operating medium or as an operating substance for the vehicle, which is routinely to be replenished and/or to be replaced or exchanged. An operating medium is, for example, oil for lubricating at least one device of the vehicle or air for tires of the vehicle, the air pressure of which can be adjusted by supplying air up to a desired value designated in each case, for example.

Alternatively or additionally, at least one adjustment of an instrument of the vehicle in accordance with a specific request is made by the, with the, and/or at the at least one station for provided services. For this purpose, the at least one station for provided services has an interface, via which the at least one station for provided services is connected to the at least one instrument of the vehicle, wherein data is transmitted to the at least one instrument by the at least one station for provided services via the interface and is used to carry out an adjustment and/or update the adjustment of the instrument in accordance with the specific request.

In one embodiment, an adjustment of the at least one instrument by the at least one station for provided services also comprises the measure that at least one component of the at least one instrument is exchanged for and/or replaced by at least one new component for the at least one instrument. It is likewise possible for the at least one instrument to be supplemented by at least one new component, and/or for at least one already present component of the at least one instrument to be removed. A removal of at least one already present component of the at least one instrument and/or a supplementation of the at least one instrument by the at least one new component is/are carried out at least in part and, if need be, in full by at least one robot at the at least one station for provided services. It is further possible that a supplementation and/or replacement of this kind is carried out at least in part manually.

In one embodiment, in advance or before the vehicle is assigned to the system, at least one station for provided services to which the vehicle is to be assigned is planned, selected, and determined.

For carrying out the electric charging operation, the at least one electric energy storage unit is connected to the at least one electric charging station via at least one electric transmission module. The at least one electric transmission module is hereby designed as a component of the system or as a component of the vehicle.

In one embodiment, an appointed time for preparing the vehicle for the at least one future drive is requested for the vehicle in the system, wherein information is made available as to which at least one provided service for the vehicle is to be made available in addition to a charging of the at least one electric energy storage unit. From said data, notification of a time of the requested appointment is communicated by the system taking into consideration at least one additional appointed time that is requested and/or scheduled for at least one additional vehicle and the appointed time is accordingly agreed on. For coordination of the appointed time, the vehicle and the system exchange data via the communication modules.

The method is carried out for an automatically driving vehicle, which is designed for the purpose of moving autonomously.

In addition, it is possible for a current position of the vehicle to be determined. Taking into consideration this current position, the position of the system, and the time for the agreed-on appointment, a route for reaching the system is planned for the vehicle.

In the method according to the invention for preparing a plurality of vehicles for future drives, a vehicle is prepared in each case through one embodiment of the method according to the invention for at least one future drive intended for a particular vehicle. By means of the system, it is possible to make available provided services to a plurality of vehicles sequentially and to charge the electric energy storage units thereof. In one embodiment, it is possible at a point in time to locate a plurality of vehicles within the system, wherein each vehicle is respectively prepared in accordance with one embodiment of the presented method for a respective future drive. It is thereby simultaneously possible for an m-th vehicle to be assigned to an m-th station for provided services and for at least one n-th vehicle to be assigned to at least one n-th station for provided services. Accordingly, the m-th vehicle is assigned to an m-th charging station and the at least one n-th vehicle is assigned to at least one n-th charging station.

Once the vehicle has been prepared for the at least one future drive, said drive can be carried out. The method can then, as a rule, be carried out again once the at least one electric energy storage unit thereof is to be recharged and the at least one provided service is to be provided to the vehicle, this being required after at least one drive, that is, after only one drive or after a plurality of drives.

The system according to the invention is designed for preparing a vehicle for one future drive or for at least one future drive, wherein the vehicle has at least one electric energy storage unit, by way of which at least one electric machine of the vehicle that is constructed for driving the vehicle is supplied or is to be supplied with electric energy. The system has at least one electric charging station and at least one station for provided services, wherein the vehicle can be assigned to the at least one station for provided services, wherein the at least one station for provided services is designed for the purpose of making available to the vehicle at least one provided service, and wherein the at least one electric charging station can be connected to the at least one electric energy storage unit.

The at least one electric charging station is designed for the purpose of supplying the at least one electric energy storage unit with electric energy. The at least one provided service can be made available to the vehicle by the at least one station for provided services and, at the same time, the at least one electric energy storage unit can be supplied with electric energy by the at least one charging station. It is thereby possible, at the same time, to make available to the vehicle at least one provided service through the at least one station for provided services and to supply the at least one energy storage unit with electric energy through the at least one charging station, as a result of which it is possible to carry out in parallel or to synchronize a charging of the at least one electric energy storage unit and to make available the at least one [other] provided service.

The at least one electric charging station can be connected to at least one electric transmission module of the system for the transmission of electric energy to the at least one electric energy storage unit. It is thereby provided, in one embodiment, that the at least one transmission module can be moved toward the at least one charging station and can be connected to the at least one electric charging station, on the one hand, and to the vehicle, on the other hand. A transmission module of this kind is designed, for example, as a transmission line or cable. Alternatively or additionally, the at least one transmission module is arranged between a plurality of stations for provided services and/or connects a plurality of stations for provided services to one another. In this case, it is possible for the at least one transmission module to be designed as a current-carrying line or busbar, which is installed in a fixed location. It is possible for the vehicle to have a current collector, which is likewise designed as an electric transmission module and is connected to the at least one transmission module of the system along said transmission module and is in electrically conductive contact also when there is movement of the vehicle along the at least one transmission module of the system.

In one embodiment, the at least one station for provided services has at least one robot, which is designed for the purpose of making available at least one provided service automatically, at least in part—for example, to service, to repair, and/or to clean at least one instrument of the vehicle and/or to transmit data to said at least one instrument, with which the at least one instrument is updated. Additionally, it is possible for the at least one provided service to be made available manually, at least in part, at the at least one station for provided services, by at least one person as a service provider.

In addition, it is possible for the at least one station for provided services to have at least one dispenser, which is designed for the purpose of automatically making available and/or adding at least one substance to the vehicle.

In accordance herewith, the system comprises at least one station for provided services or service station as well as at least one infrastructure, which is movable in one embodiment, and, accordingly, an electric charging station for a self-driving vehicle, for example, which is designed and/or is referred to as an electric vehicle, for example.

By means of the method, it is possible, during a charging of the at least one electric energy storage unit of the vehicle, to additionally also to take care of other services for said vehicle and, accordingly, to prepare it for the intended, at least one future drive. In the case of at least one provided service that can thereby be carried out, what is involved is, for example, a washing, namely, in one embodiment, a washing of the exterior of the vehicle, a cleaning, namely, in one embodiment, a cleaning of the interior of the vehicle, a performance of maintenance or maintenance work, a refilling of an operating fluid, such as, for example, a braking fluid, a lubricating oil, and/or a fluid for a window wiper unit, and a provision of food and/or beverages as well as a personalized item of at least one instrument in regard to a specific customer wish, wherein, for this purpose, the at least one instrument is adapted to the customer's wish as a possible specified request.

The method can also be implemented for a fleet composed of a plurality of vehicles, which are designed to be self-driving or automatically driving and are also electrified. It is thereby possible to charge said vehicles with electric energy and to take care of other services for them and/or to service them. For this purpose, in one embodiment, specific provided services, which can be made available by the at least one station for provided services, are chosen for each vehicle. Depending on the workload of the station for provided services as well as on the plurality of electric charging stations, which are designed as components of the system, it is possible, at the same time, to prepare each of a plurality of vehicles for at least one future drive.

Furthermore, it is possible at the same time to carry out a charging of the at least one electric energy storage unit and to perform the at least one [other] provided service, usually to carry out at least one working step associated with the at least one [other] provided service. In one embodiment, the at least one electric energy storage unit is connected to the at least one electric charging station during the entire method. During said method, it is possible for the at least one station for provided services to make available to the vehicle the at least one provided service and, as a rule, a plurality of provided services. This also comprises the measure that, for the vehicle, a plurality of stations for provided services are made available at the same time, during which the at least one electric energy storage unit is connected to the at least one electric charging station. Accordingly, for preparing a vehicle, it is possible in each case, in addition to charging the at least one electric energy storage unit, to make available at least one additional provided service, as a result of which time is saved in comparison to a procedural approach in which the individual provided services are made available sequentially, one after the other, and the vehicle is additionally supplied afterwards or before with electric energy.

Accordingly, it is then possible to carry out a preparation of the vehicle, such as, for example, taking care of other services for the vehicle and charging the at least one electric energy storage unit, in parallel and simultaneously, which, for example, also saves space and time in regard to a servicing of the vehicle in the scope of a preparation, this being the case, among other things, when the vehicle to be prepared is an autonomously driving vehicle.

In a possible implementation of the method, it is provided that at least one communication module of the system exchanges data with a communication module of the vehicle via electromagnetic waves. Through the mutual exchange of information of this kind between the vehicle and the system via the communication modules, at least one station for provided services or service station for a vehicle to be prepared is reserved, among other things, for scheduling a full utilization of the system once a list of those provided services that are to be carried out and/or made available to the vehicle, in addition to a charging of the at least one electric storage unit, has been transmitted from the vehicle to the system. Depending on a feedback of the system to the vehicle, a specific route for the vehicle to reach the system is optimized starting from the current position of the vehicle. In addition, it is possible for a specified request to be transmitted from the vehicle to the system for a quantity of energy that needs to be made available.

In one embodiment, it is possible for the vehicle, when it drives into the system, to be coupled automatically to the at least one electric charging station and, accordingly, to a charging infrastructure, via an electric transmission module of the vehicle, which is designed as a current collector, as well as via an electric transmission module of the system. A charging operation that is to be carried out for the at least one electric energy storage unit can, in one embodiment, be distributed over a plurality of charging stations of the system. In this way, among other things, it is ensured that a requested quantity of energy is adhered to and/or can be made available. A billing for the vehicle is made available on the basis of a delivered quantity of energy. It is thereby possible for said quantity of electric energy to be made available proportionately by a plurality of charging stations.

The at least one charging station is connected via the at least one charging module to the at least one electric energy storage unit of the vehicle. It is thereby possible for the at least one transmission module to be designed as a cable and, accordingly, as a line for transmitting electric energy. It is also possible for the at least one transmission module to be designed for the purpose of transmitting the electric energy inductively and/or capacitively to the at least one electric energy storage unit. Furthermore, it is possible for the at least one transmission module to be designed as a sliding contact and, accordingly, as a current collector, via which the vehicle is in electrically conductive connection through a busbar, for example, with the at least one charging station. The at least one electric charging station remains connected to said vehicle via the at least one transmission module during a period of layover of the vehicle in the station and/or depending on a difference between a desired state of charge and an actual state of charge of the at least one electric energy storage unit.

In one embodiment, it is provided that the vehicle drives toward the system and/or is driven to the system within an appointed time that is scheduled and/or provided for it. A position of the vehicle is thereby specified by the system through implementation of a mini-multi-route planning, for example. Furthermore, it is possible for the vehicle to be transported by the system using a transport device of the system. In this case, it is provided that the vehicle is connected via a connecting element, such as a towing rope or a towing chain, for example, to the transport apparatus of the system, which, in turn, pulls the vehicle via the connecting element through the system from one station for provided services to another station for provided services. However it is also possible for the usually automatically driving vehicle to traverse the system autonomously from one station for provided services to another station for provided services. Depending on a respectively required provided service, the vehicle moves automatically and/or is piloted to a particular section of the system that is assigned to a particular station for provided services, with which the respectively required provided service can be made available. In addition, in one embodiment, the vehicle is already connected, as a rule, automatically to the at least one electric charging station via the at least one transmission module when the system is reached. The vehicle is then connected, at the latest at this time, via the at least one transmission module to the at least one electric charging station when, within the system, it has reached a section to which the at least one electric charging station is assigned.

As a rule, the system comprises a plurality of stations for provided services, the provided services of which are each booked for a vehicle. Thus, a possible provided service comprises a washing of the vehicle on the outside, wherein a washing of this kind can be carried out depending on the degree of soiling, wherein, on the basis of the degree of soiling, a determination is made as to which measures are to be carried out for washing the vehicle. For cleaning the interior of the vehicle as a possible provided service, it is provided that the vehicle is automatically unlocked and/or the doors thereof are automatically opened. At least one additional provided service may comprise the conducting of maintenance work on the vehicle. In addition, at least one provided service makes available and, accordingly, adds a substance to the vehicle. For example, this relates to the measure of furnishing the vehicle with food and/or beverages that contain at least one consumable substance. In making available at least one provided service, however, it is also possible to refill the vehicle with an operating fluid and, accordingly, likewise to add at least one [operating] substance.

It is likewise possible, when at least one provided service is made available, to adapt the vehicle and/or the equipment thereof to a customer wish as a specified request. It is thereby possible, for example, to arrange in the vehicle at least one child seat or to renew and/or replace a cover of at least one seat, such as, for example, a cover made of cloth or leather.

Through exchange of data between the communication module of the vehicle and the at least one communication module of the system, it is possible to take into consideration a time interval desired by a customer or a desired time period for preparation of the vehicle, wherein a beginning of the preparation of the vehicle for the at least one future drive as well as a duration of the preparation are taken into consideration. Furthermore, via the at least one communication module, an availability of the system and/or the availability of at least one station for provided services is taken into consideration. In addition, it is possible to make available information as to which provided services can be carried out. In addition, it is possible, via the at least one communication module, to bill the preparation of the vehicle for the future drive or for the at least one future drive and, optionally, to pay the bill.

In one embodiment, it is possible for the vehicle to have, as a possible current collector, an additional charging socket in its underbody, for example, which, when the vehicle is driven into the system—for example, into a washing system as a station for provided services—is connected automatically to the at least one charging station and, accordingly, to an electric energy grid of the system. The at least one transmission module, which can be connected to the at least one electric charging station, is designed, for example, as an inductive charging plate, which is arranged in a floor of the system and/or in the at least one station for provided services and moves together with the vehicle, wherein the at least one electric energy storage unit is supplied with electric energy by the at least one electric charging station.

It is obvious that the features mentioned above and yet to be explained below may be used not only in the particular given combination, but also in other combinations or alone, without departing from the scope of the present invention.

BRIEF DESCRIPTION OF THE FIGURES

The invention is illustrated schematically in the drawings on the basis of embodiments and is described schematically and in detail with reference to the drawings.

DETAILED DESCRIPTION

The figures are described in a combined and overarching manner, with identical components being assigned the same reference numbers.

Figure 1:
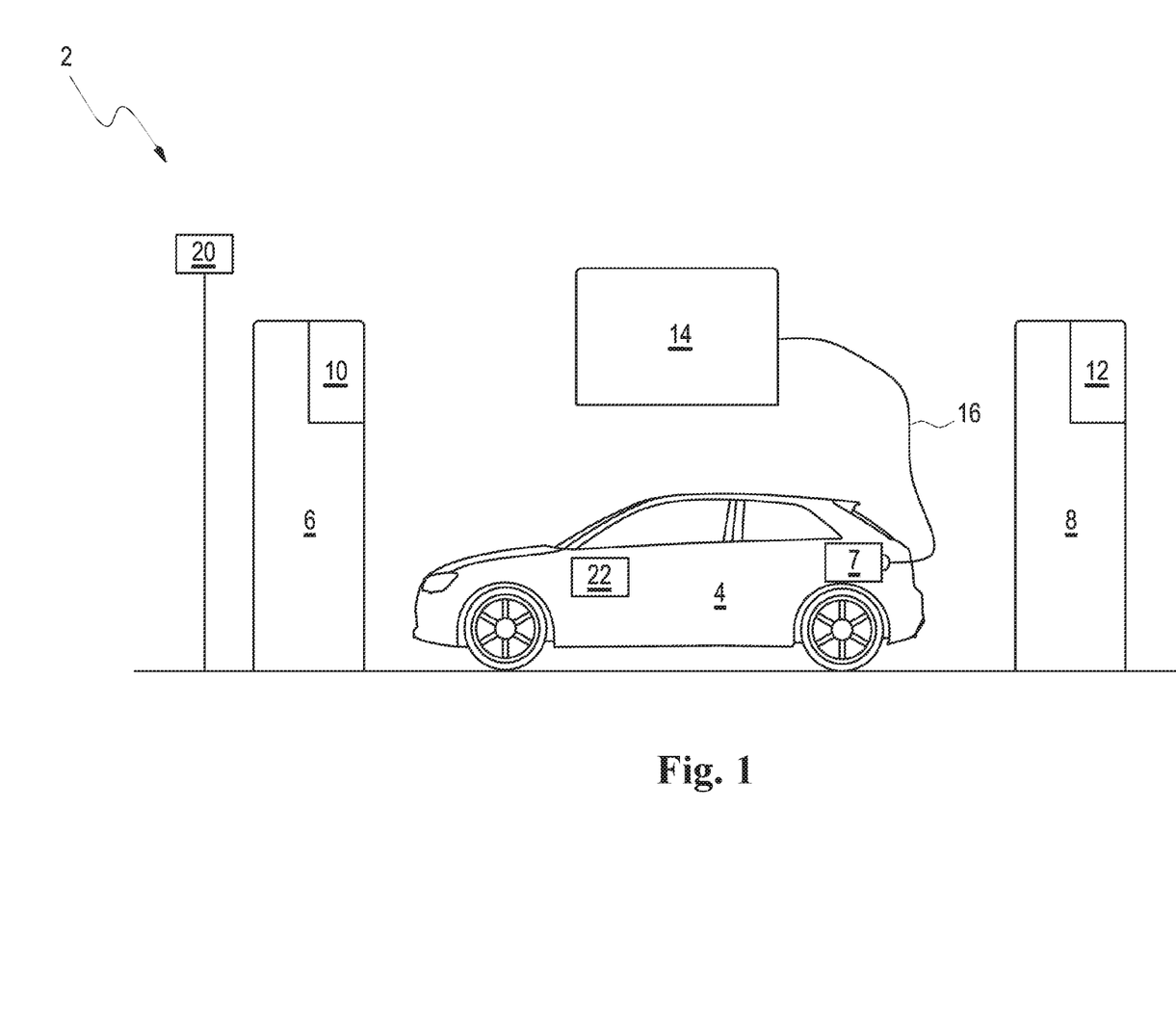
FIG. 1 shows, in schematic illustration, a first embodiment of the system according to the invention.

The first embodiment of the system 2 according to the invention, which is illustrated schematically in FIG. 1, is designed for the purpose of preparing a vehicle 4 for at least one future drive. The system 2 here comprises a first station for provided services 6 and a second station for provided services 8. In this case, each of these two stations for provided services 6, 8 comprises a robot 10, 12 for carrying out and/or making available a particular provided service, wherein a particular provided service comprises, for example, a cleaning of at least one component of the vehicle 4, a service of at least one component of the vehicle 4, and/or an adjustment of at least one component or of at least one instrument of the vehicle 4 for the at least one future drive.

In addition, it is provided that the vehicle 4 has at least one electric energy storage unit 7, which is designed for the purpose of making available electric energy to at least one electric machine of the vehicle 4, by means of which the vehicle 4 is moved and, accordingly, is driven. Of course, it is regularly necessary to supply the at least one electric energy storage unit 7 with electric energy and, accordingly, to recharge it. For this purpose, the first embodiment of the system 2 has an electric charging station 14, which is further assigned an electric transmission module, which is designed here as a cable 16, via which the at least one electric energy storage unit 7 of the vehicle 4 can be connected to the charging station 14 for carrying out an electric charging operation.

In one embodiment of the method according to the invention, it is provided here that at least one provided service is made available to the vehicle 4 by at least one station for provided services 6, 8, wherein, the at least one electric energy storage unit 7 of the vehicle 4 is charged with electric energy when the at least one provided service is made available by the electric charging station 14, which is also possible when the vehicle 4 is moving.

Furthermore, the system 2 has at least one communication module 20. It is thereby possible for the at least one communication module 20 to be assigned to at least one station for provided services 6, 8 and/or charging station 14. The vehicle 4 likewise has at least one communication module 22. Accordingly, it is possible for the system 2 and the vehicle 4 to exchange data via electromagnetic waves. In the scope of the method, it is provided that the vehicle 4 establishes contact with the system 2, wherein the vehicle 4 and the system 2 agree on an appointed time at which the provided services can be made available to the vehicle 4 and the electric charging operation can be carried out. When there is an agreement on the appointed time between the vehicle 4 and the system 2, information is exchanged as to which provided service is required for the vehicle 4 and what quantity of electric energy is to be charged into the at least one energy storage unit 7, among other things.

Once the vehicle 4 is situated in the system 2, it is provided, in one embodiment, that the vehicle 4 and the at least one station for provided services 6, 8 as well as the charging station 14 exchange data. Among other things, the vehicle 4 can be located. The vehicle 4 is likewise to be provided with information as to which itinerary or route the vehicle 6 needs to move along, usually automatically, within the system 4 from one station for provided services 6, 8 and/or charging station 14 to the next station for provided services 6, 8 and/or charging station 14.

Figure 2:
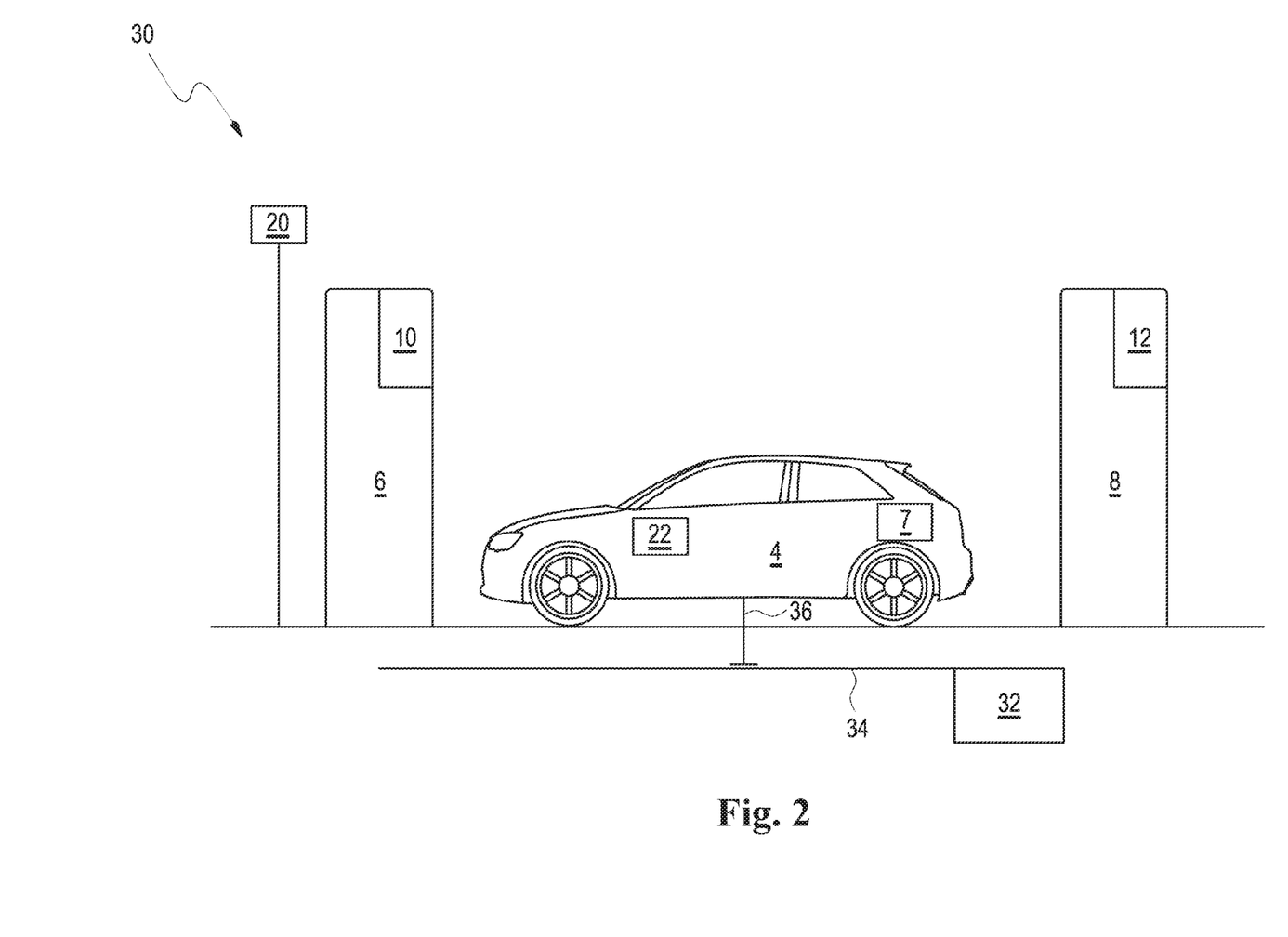
FIG. 2 shows, in schematic illustration, a second embodiment of the system according to the invention.

The second embodiment 30 of the system according to the invention, illustrated in FIG. 2, is designed for the purpose of preparing a vehicle 4 for at least one future drive. In this case, said second embodiment 30 of the system comprises, just like the first embodiment of the system 2, a first station for provided services 6 and a second station for provided services 8, wherein each of these two stations for provided services 6, 8 comprises a robot 10, 12 for carrying out and/or making available a respective provided service.

For carrying out a charging operation for the at least one electric energy storage unit 7 of the vehicle 4, the second embodiment of the system 30 has an electric charging station 32, which is further assigned an electric transmission module, which is designed as a busbar 34.

In addition, the vehicle 4 has an electric transmission module that is designed as a current collector 36. For carrying out the charging operation, the current collector 36 of the vehicle 4 is connected to the busbar 34 of the system 30. Via the two electric transmission modules, which are in electrically conductive contact, energy is transmitted from the charging station 32 to the at least one electric energy storage unit 7, wherein it is possible for the vehicle 4 to move in relation to the busbar 34.

In addition, in one embodiment of the method according to the invention, at least one provided service is made available to the vehicle 4 by at least one station for provided services 6, 8, simultaneously to carrying out the charging operation.

The invention claimed is:

1. A method for preparing a vehicle for at least one future drive, comprising:
the vehicle has at least one electric energy storage unit, with which at least one electric machine of the vehicle, which is designed for driving the vehicle, is supplied with electric energy, wherein the vehicle is assigned to a system, which has at least one electric charging station and at least one station for provided services, wherein the vehicle is further assigned to the at least one station for provided services, with which at least one provided service is made available to the vehicle, and wherein the at least one electric energy storage unit is connected to the at least one electric charging station when the at least one provided service is made available, and, through said at least one electric charging station, is supplied with electric energy,
wherein the at least one electric energy storage unit and the at least one charging station are connected to each another in an electrically conductive manner via at least one electric transmission module,
wherein the at least one electric transmission module is designed as a busbar, and
wherein the busbar is installed in a fixed location, and the vehicle is configured to move in relation to the busbar,
wherein the at least one electric transmission module is further designed as a sliding contact, and the vehicle, via a current collector, is in an electrically conductive connection through the busbar,
wherein the busbar has a predetermined distance so that the current collector of the vehicle is in the electrically conductive connection through the busbar during the sliding contact,
wherein the vehicle and the system wirelessly exchange information via at least one communication module,
wherein the system includes at least one camera, the at least one camera is arranged at an elevated position within the system, a distance of the at least one camera from a ground is greater than a height of the vehicle,
wherein the system recognizes and locates the vehicle by the at least one communication module and the at least one camera,
wherein during the vehicle is situated within the system, a communication connection is established between the vehicle and the at least one station of the system for the at least one provided service, the vehicle is located within the system in relation to the at least one station for the at least one provided service,
wherein the communication connection is established for the information as to when the at least one provided service is made available to the vehicle, how far the at least one provided service is progressed, and when the at least one provided service is ended,
wherein, for the vehicle, an appointed time for preparing the vehicle in the system for the at least one future drive is requested, wherein information is made available as to which the at least one provided service for the vehicle is to be made available in addition to and simultaneously to a charging of the at least one electric energy storage unit, wherein, by the system, taking into consideration at least one additional appointed time, which is scheduled for at least one additional vehicle, information concerning a time of the requested appointment is transmitted by the system to the vehicle,
wherein an interval between the appointed time and the at least one additional appointed time is analyzed by the system and communicated with the at least one additional vehicle.

2. The method according to claim 1, wherein the vehicle is cleaned and/or is serviced by the at least one station for provided services.

3. The method according to claim 1, wherein at least one substance is added to the vehicle by the at least one station for provided services.

4. The method according to claim 1, wherein at least one setting of an instrument of the vehicle is adjusted in accordance with a specified request by the at least one station for provided services.

5. The method according to claim 1, wherein a choice and determination is made as to which at least one station for provided services is to be assigned to the vehicle before the vehicle is assigned to the system.

6. The method according to claim 1, which is carried out for an automatically driving vehicle.

7. A method for preparing a plurality of vehicles for future drives, wherein, in each case, a vehicle is prepared by a method according to claim 1 for at least one future drive.

8. A system for preparing a vehicle for at least one future drive, comprising:
the vehicle has at least one electric energy storage unit, with which at least one electric machine, which is designed for driving the vehicle, is supplied with electric energy, wherein the system has at least one electric charging station, which is designed for the purpose of making available electric energy to the energy storage unit, and at least one station for provided services, which is designed for the purpose of making available to the vehicle at least one provided service, wherein the vehicle is assigned to the system and further to the at least one station for provided services, with which at least one provided service is provided for the vehicle, and wherein the at least one electric energy storage unit is connected to the at least one electric charging station when the at least one provided service is made available, and is supplied with electric energy through said at least one electric charging station,
wherein the system further comprises at least one electric transmission module, which is designed for the purpose of connecting the at least one electric charging station to the at least one electric energy storage unit for the transmission of electric energy,
wherein the at least one electric transmission module is further designed as a busbar,
wherein the busbar is installed in a fixed location, and the vehicle is configured to move in relation to the busbar,
wherein the at least one electric transmission module is further designed as a sliding contact, and the vehicle, via a current collector, is in an electrically conductive connection through the busbar,
wherein the busbar has a predetermined distance so that the current collector of the vehicle is in the electrically conductive connection through the busbar during the sliding contact,
wherein the vehicle and the system wirelessly exchange information via at least one communication module,
wherein the system includes at least one camera, the at least one camera is arranged at an elevated position within the system, a distance of the at least one camera from a ground is greater than a height of the vehicle, wherein the system recognizes and locates the vehicle by the at least one communication module and the at least one camera, wherein during the vehicle is situated within the system, a communication connection is established between the vehicle and the at least one station of the system for the at least one provided service, the vehicle is located within the system in relation to the at least one station for the at least one provided service, and wherein the communication connection is established for the information as to when the at least one provided service is made available to the vehicle, how far the at least one provided service is progressed, and when the at least one provided service is ended, wherein, for the vehicle, an appointed time for preparing the vehicle in the system for the at least one future drive is requested, wherein information is made available as to which the at least one provided service for the vehicle is to be made available in addition to and simultaneously to a charging of the at least one electric energy storage unit, wherein, by the system, taking into consideration at least one additional appointed time, which is scheduled for at least one additional vehicle, information concerning a time of the requested appointment is transmitted by the system to the vehicle, wherein an interval between the appointed time and the at least one additional appointed time is analyzed by the system and communicated with the at least one additional vehicle.

9. The system according to claim 8, wherein the at least one transmission module is arranged between a plurality of stations for provided services and/or connects a plurality of stations for provided services to one another.

10. The system according to claim 8, wherein the at least one station for provided services has at least one robot, which is designed for the purpose of making available automatically at least one provided service.

11. The system according to claim 8, wherein the at least one station for provided services has at least one dispenser, which is designed for the purpose of making available and/or adding automatically at least one substance to the vehicle.

12. The method according to claim 1, wherein the vehicle is transported by the system using a transport device of the system, the transport device includes a connecting element, and the vehicle is connected via a connecting element which pulls the vehicle from one station to another station for the at least one provided service.

\* \* \* \* \*